(12) United States Patent
Claxton

(10) Patent No.: US 7,322,166 B1
(45) Date of Patent: Jan. 29, 2008

(54) APPARATUS FOR UNWRAPPING AND TRANSPORTING FRANGIBLE WAFERS FOR ICE CREAM SANDWICHES AND THE LIKE

(75) Inventor: Bruce Claxton, Washington Court House, OH (US)

(73) Assignee: Norse Dairy Systems, Inc., Columbus, OH (US)

( * ) Notice: Subject to any disclaimer, the term of this patent is extended or adjusted under 35 U.S.C. 154(b) by 0 days.

(21) Appl. No.: 11/255,896

(22) Filed: Oct. 21, 2005

(51) Int. Cl.
*B65B 43/26* (2006.01)
*A21C 9/04* (2006.01)

(52) U.S. Cl. .............. 53/381.1; 53/230; 99/450.4

(58) Field of Classification Search ........... 53/381.1, 53/381.2, 381.3, 386.1, 222, 223, 228, 230, 53/232; 99/450.4, 450.7
See application file for complete search history.

(56) References Cited

U.S. PATENT DOCUMENTS

| | | | |
|---|---|---|---|
| 466,928 A | 1/1892 | Graves | 194/277 |
| 740,457 A | 10/1903 | McGirr | 53/222 |
| 1,281,870 A | 10/1918 | Strand | 221/183 |
| 1,356,722 A | 10/1920 | Kaupke | 198/318 |
| 1,825,058 A | 9/1931 | Goldstein et al. | 53/252 |
| 1,916,974 A | 7/1933 | Fuller et al. | 221/15 |
| 2,429,510 A | 10/1947 | Callison | 221/68 |
| 2,503,518 A | 4/1950 | Slaughter | 156/243 |
| 2,677,900 A | 5/1954 | Mann, Jr. | 34/225 |
| 2,794,404 A | 6/1957 | Rapp | 99/450.4 |
| 3,006,119 A | 10/1961 | Fingerhut | 53/438 |
| 3,080,691 A | 3/1963 | Benner | 53/464 |
| 3,108,881 A | 10/1963 | Shaw et al. | 426/412 |
| 3,119,353 A | 1/1964 | Roehn, Jr. | 99/450.4 |
| 3,316,860 A | 5/1967 | Peterson | 99/450.4 |
| 3,339,339 A | 9/1967 | Hull et al. | 53/223 |
| 3,458,086 A | 7/1969 | Strohmeier | 221/201 |
| 3,468,412 A | 9/1969 | Forman | 206/497 |
| 3,479,788 A | 11/1969 | Dreyfus | 53/442 |
| 3,529,756 A * | 9/1970 | Smith | 53/381.3 |
| 3,600,875 A | 8/1971 | Buob et al. | 139/452 |
| 3,683,586 A | 8/1972 | Duckhinsky et al. | 53/228 |
| 3,713,563 A | 1/1973 | Dickensheets et al. | 221/205 |
| 3,729,885 A | 5/1973 | Mosetich et al. | 53/399 |
| 3,739,545 A | 6/1973 | Lattke | 53/456 |
| 3,834,119 A | 9/1974 | Armitt et al. | 53/230 |
| 3,861,120 A | 1/1975 | Gordon | 53/230 |
| 3,889,442 A * | 6/1975 | Grahn et al. | 53/381.2 |
| 3,934,334 A | 1/1976 | Hanni | 29/846 |
| 3,967,433 A | 7/1976 | Bonfiglioli | 53/441 |
| 4,078,362 A | 3/1978 | Ellis | 53/222 |
| 4,094,236 A | 6/1978 | Holmes et al. | 99/450.4 |
| 4,098,057 A | 7/1978 | Holcomb | 53/230 |
| 4,172,480 A | 10/1979 | Ellis | 141/169 |

(Continued)

*Primary Examiner*—Louis Huynh
(74) *Attorney, Agent, or Firm*—Roger A. Gilcrest

(57) ABSTRACT

The present invention is an apparatus and method for unwrapping a package of frangible articles bearing a wrapping material, the wrapping material having a rear portion and a forward tab, the forward tab adapted to open the wrapping material when pulled, the apparatus comprising: (a) a support member for supporting the package; (b) a grasping mechanism adapted to grasp the forward tab and to pull the forward tab so as to open the wrapping material; (c) an engaging mechanism adapted to grasp the rear portion and pull the wrapping material so as to remove the wrapping material from the frangible articles. The invention may be used in conjunction with standard confection filling, transport and packaging machinery and mechanisms.

10 Claims, 6 Drawing Sheets

U.S. PATENT DOCUMENTS

| | | | |
|---|---|---|---|
| 4,213,417 A | 7/1980 | Ellis | 118/30 |
| 4,244,158 A | 1/1981 | Nelham | 53/412 |
| 4,390,313 A * | 6/1983 | Hoehn | 53/381.2 |
| 4,421,019 A | 12/1983 | Hocking et al. | 99/450.4 |
| 4,429,510 A | 2/1984 | Thimon | 53/167 |
| 4,443,176 A | 4/1984 | Battistone | 425/276 |
| 4,447,458 A | 5/1984 | Roth et al. | 426/275 |
| 4,466,229 A | 8/1984 | Gino | 53/559 |
| 4,515,819 A | 5/1985 | Shinriki | 426/297 |
| 4,537,121 A | 8/1985 | Bero et al. | 99/450.4 |
| 4,580,411 A | 4/1986 | Orfitelli | 62/371 |
| 4,580,476 A | 4/1986 | Jones | 83/160 |
| 4,584,933 A | 4/1986 | Price | 99/450.4 |
| 4,612,852 A | 9/1986 | Price et al. | 99/450.4 |
| 4,615,264 A | 10/1986 | Rose | 99/450.4 |
| 4,628,664 A | 12/1986 | Price | 53/232 |
| 4,644,901 A | 2/1987 | Jones | 118/694 |
| 4,729,589 A | 3/1988 | Puskar | 294/26.5 |
| D298,757 S | 11/1988 | Bergan | D15/145 |
| 4,812,323 A | 3/1989 | Savage | 426/496 |
| 4,852,332 A | 8/1989 | Becker et al. | 53/436 |
| 4,859,168 A | 8/1989 | Calder | 425/284 |
| 4,910,030 A | 3/1990 | Trojahn | 436/94 |
| 4,989,720 A | 2/1991 | Price et al. | 198/430 |
| 5,042,638 A | 8/1991 | Price | 198/430 |
| 5,059,082 A * | 10/1991 | Tanttu et al. | 53/381.2 |
| 5,299,675 A | 4/1994 | Schumann et al. | 198/392 |
| 5,437,144 A | 8/1995 | Akiyama et al. | 53/466 |
| 5,493,957 A | 2/1996 | Kennedy et al. | 99/450.4 |
| 5,515,962 A | 5/1996 | Kennedy et al. | 198/430 |
| 5,523,103 A | 6/1996 | Loalbo | 426/302 |
| 5,540,141 A | 7/1996 | Grubzak | 99/450.4 |
| 5,652,005 A | 7/1997 | Loalbo | 426/76 |
| 5,789,008 A | 8/1998 | Monte | 426/293 |
| 5,931,086 A | 8/1999 | Kennedy et al. | 99/450.4 |
| 6,016,639 A | 1/2000 | Spencer | 53/230 |
| 6,039,988 A | 3/2000 | Monte | 426/94 |
| 6,251,455 B1 | 6/2001 | Thomas | 426/306 |
| 6,251,456 B1 | 6/2001 | Maul et al. | 426/306 |
| 6,340,488 B1 | 1/2002 | French et al. | 426/302 |
| 6,399,124 B1 | 6/2002 | Lesens et al. | 426/61 |
| 6,464,104 B1 | 10/2002 | Waddell | 221/150 A |
| 6,511,405 B1 | 1/2003 | Focke et al. | 493/70 |
| 6,725,631 B2 * | 4/2004 | Skrak et al. | 53/381.2 |
| 6,824,799 B1 | 11/2004 | Huang et al. | 426/94 |

* cited by examiner

APPARATUS FOR UNWRAPPING AND TRANSPORTING FRANGIBLE WAFERS FOR ICE CREAM SANDWICHES AND THE LIKE

TECHNICAL FIELD OF THE INVENTION

The present invention is in the field of machines for producing confections.

BACKGROUND AND SUMMARY OF THE INVENTION

The present invention relates generally to machines for the formation of confections such as sandwich-type comestibles, and more particularly to the formation of ice cream sandwiches consisting of flat wafers having a layer of ice cream disposed between them. More particularly, the present invention relates to such machines as employ the assembly of the ice cream sandwich in the vertical direction.

The preparation of ice cream sandwiches and the corresponding equipment known for such preparation has existed for many years. Particularly, equipment that relies upon the vertical assembly of the ice cream sandwiches by the extrusion of the ice cream and the conjoint delivery of adjacent wafers thereto, followed by the vertically downward disposition of the formed ice cream sandwich into an index wheel for disposition onto a conveyor for wrapping, packaging and later operations, is all well-known. Representative U.S. patents illustrating the production of such confections and the general operation of equipment for producing and handling them include U.S. Pat. Nos. 2,794,404; 3,316,860; 3,119,353; 3,834,119; 4,078,362; 4,094,236; 4,098,057; 4,172,480; 4,213,417; 4,244,158; 4,421,019; 4,443,176; 4,447,458; 4,515,819; 4,537,121; 4,580,411; 4,580,476; 4,584,933; 4,612,852; 4,615,264; 4,628,664; 4,644,901; 4,729,589; 4,812,323; 4,989,720; 5,042,638; 5,493,957; 5,515,962; 5,523,103; 5,540,141; 5,652,005; 5,789,008; 5,931,086; 6,016,639; 6,039,988; and 6,824,799. All of the above are incorporated herein by reference.

The aforementioned disclosures include those relating to an extrusion-type ice cream sandwich making machine, which operates by the extrusion of the ice cream sandwich, the disposition of the thus formed ice cream sandwich into an index wheel having a plurality of slots, and the indexed rotation of the wheel into position for removal of the sandwich and disposition onto a conveyor for further processing and packaging.

Through the years numerous modifications have been made to the equipment generally disclosed in the aforementioned patents, to improve efficiency and speed of operation, and to correspondingly reduce downtime caused by misfeeds and the like. Notwithstanding the efforts that have been applied in such connection, certain aspects of the equipment continue to represent time consumptive delays and inefficiencies in processing.

One of the continuing sources of inefficiency and time cost occurs in the unwrapping of packaged wafers and loading of the wafers onto the inclined wafer trays or chutes that feed the cookies into position for the formation of the sandwich by the action of the extruder die or nozzle, and the index wheel that receives the formed sandwich. The wafers typically come packaged in a bundle and must be unwrapped and loaded onto the chutes in series by hand. These inclined wafer trays or chutes must be loaded by hand with unwrapped wafers, and the operator typically will be tasked with the operation of more than one machine or chute. Due to the speed with which the wafers are processed by the ice cream sandwich machine, the operator typically must remain near the machinery and normally will be tasked with loading opposing chutes on more than one machine.

Another problem to be addressed by the present invention is that the handling and processing of such frangible articles by and for dispensing machinery often leads to broken articles. If not removed from the processing stream, broken wafers can lead to poor product quality, and the required interruptions in the operation of the machinery for removing broken wafers from the chutes and machinery.

The present invention relates generally to an improved apparatus for unwrapping ice cream sandwich wafers, particularly those having a tab designed to open the package.

Some of the advantages of the present invention include reducing the need for unwrapping the wafers by hand, and thus eliminating a source of potential contamination and inefficiency. Using the present invention, the machine operator need not constantly attend the machine over extended periods of operation for loading the chutes by hand and clearing broken wafers, thus allowing the operator to attend to other duties or even attend multiple machines.

The present invention also allows for the more regular operation of these machines by removing broken wafers from the production stream, so as to eliminate the need for the chutes to be cleared of broken wafers by hand, and preventing undesirable products from reaching the point where the ice cream sandwich (or other confection) is formed.

The apparatus of the present invention may be applied to an apparatus as described in U.S. Pat. No. 5,493,957, which is hereby incorporated herein by reference.

Unwrapping Apparatus

In general terms, the present invention includes an apparatus for unwrapping a package of frangible articles bearing a wrapping material, the wrapping material having a rear portion and a forward tab, the forward tab adapted to open the wrapping material when pulled, the apparatus comprising: (a) a support member for supporting the package; (b) a grasping mechanism adapted to grasp the forward tab and to pull the forward tab so as to open the wrapping material; (c) an engaging mechanism adapted to grasp the rear portion and pull the wrapping material so as to remove the wrapping material from the frangible articles.

It is preferred that the frangible articles are in a series aligned substantially perpendicular to the longitudinal axis of the support member.

The apparatus may optionally and preferably include a vacuum to remove the wrapping material from the engaging mechanism.

The apparatus also may include a guide mechanism adapted to engage the frangible articles in a series and move the frangible articles along the support member.

It is preferred that the support member is in the form of a chute having a bottom and sides, and a longitudinal axis and a gap in the bottom and running along the longitudinal axis, such that, as the frangible articles are moved in the series, frangible articles in the series that are broken fall through the gap. It is most preferred that the bottom of the support member has a raised portion on either side of the gap, such that, as the frangible articles are moved in the series, frangible articles in the series that are broken fall through the gap.

It is also preferred that the support member is inclined to the horizontal to allow it to function with know ice cream sandwich making machinery.

The apparatus may also include a robotic loader adapted to grasp a package of frangible articles and place it onto the support member.

Method of Unwrapping Packaged Articles on a Conveyor

The present invention also includes a method of unwrapping a package of frangible articles bearing a wrapping material, the wrapping material having a rear portion and a forward tab, the forward tab adapted to open the wrapping material when pulled, the method comprising: (a) placing a package of frangible articles bearing a wrapping material on a support member for supporting the package, the wrapping material having a rear portion and a forward tab; (b) mechanically grasping the forward tab and pulling the forward tab so as to open the wrapping material; and (c) mechanically engaging the rear portion and pulling the wrapping material so as to remove the wrapping material from the frangible articles.

The method preferably includes placing the frangible articles in a series aligned substantially perpendicular to the longitudinal axis of the support member.

It is also preferred that the wrapping material is removed following step (c) by a vacuum, and that the support member is inclined to the horizontal.

Overall Machine Including Unwrapping Apparatus

Another aspect of the present invention is a machine for the preparation of a sandwich product comprising: (a) a sandwich product assembly station comprising an extruder nozzle mounted for discharge of a comestible filling material in the downward direction; paired wafer trays for feeding wafers against opposite sides of the extruder nozzle; each wafer tray having an apparatus for unwrapping a package of frangible wafers bearing a wrapping material, the wrapping material having a rear portion and a forward tab, the forward tab adapted to open the wrapping material when pulled, the apparatus comprising: (1) a grasping mechanism adapted to grasp the forward tab and to pull the forward tab so as to open the wrapping material; (2) an engaging mechanism adapted to grasp the rear portion and pull the wrapping material so as to remove the wrapping material from the frangible articles; and (b) sandwich indexing wheel rotatably mounted below the sandwich product assembly station, the indexing wheel defining a plurality of circumferentially positioned pockets for receiving and transferring assembled sandwiches for conveyance.

It is preferred that the apparatus additionally include a loader for loading packages of frangible wafers onto each the wafer tray, and that it include a conveyor below the sandwich indexing wheel for conveying assembled sandwiches, a wrapping device to wrap the assembled sandwiches, and a packaging device to which the conveyor conveys the assembled sandwiches. The additional conveying, wrapping and packaging apparatus may be of the type known and used in the art.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

DETAILED DESCRIPTION OF THE PREFERRED EMBODIMENT

Figure 1:
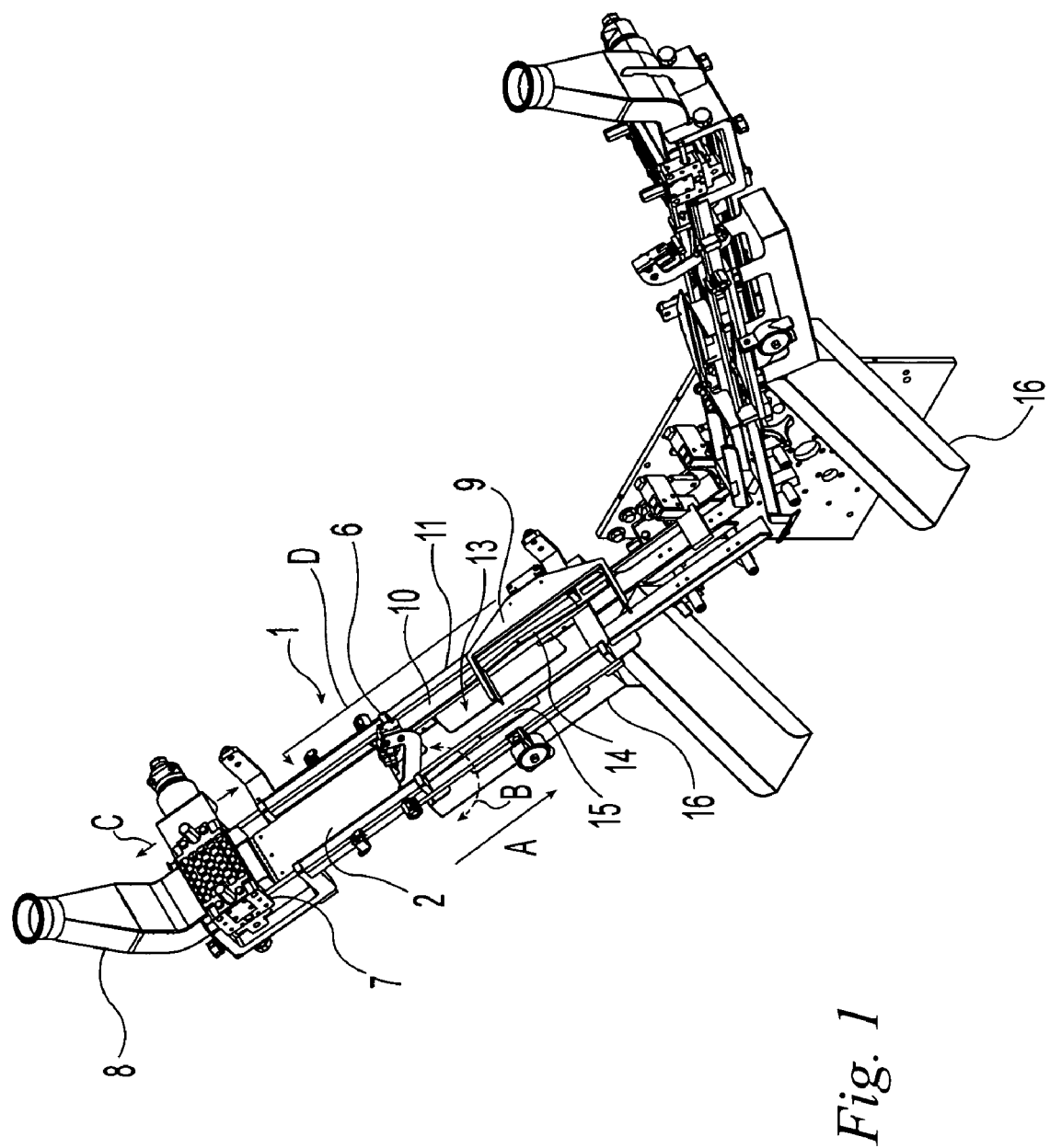
FIG. 1 is a perspective view of an apparatus for unwrapping a package of frangible articles bearing a wrapping material shown in one operational position, in accordance with one embodiment of the present invention.

In accordance with the foregoing summary of the invention, the following presents a detailed description of the preferred embodiment, which is considered to be the best mode thereof.

FIGS. 1-4 are perspective views of an apparatus 1 for unwrapping a package of frangible articles bearing a wrapping material in various operational positions, in accordance with one embodiment of the present invention. The apparatus has two mirror image halves that are described herein by describing one side of the apparatus, the other side having corresponding structure. FIGS. 1-6 use the same reference numerals to identify portions of the apparatus.

FIG. 1 shows the apparatus 1 having a support member 2 for supporting the package of frangible articles, in the operational position awaiting the placement of a package of frangible articles.

Figure 2:
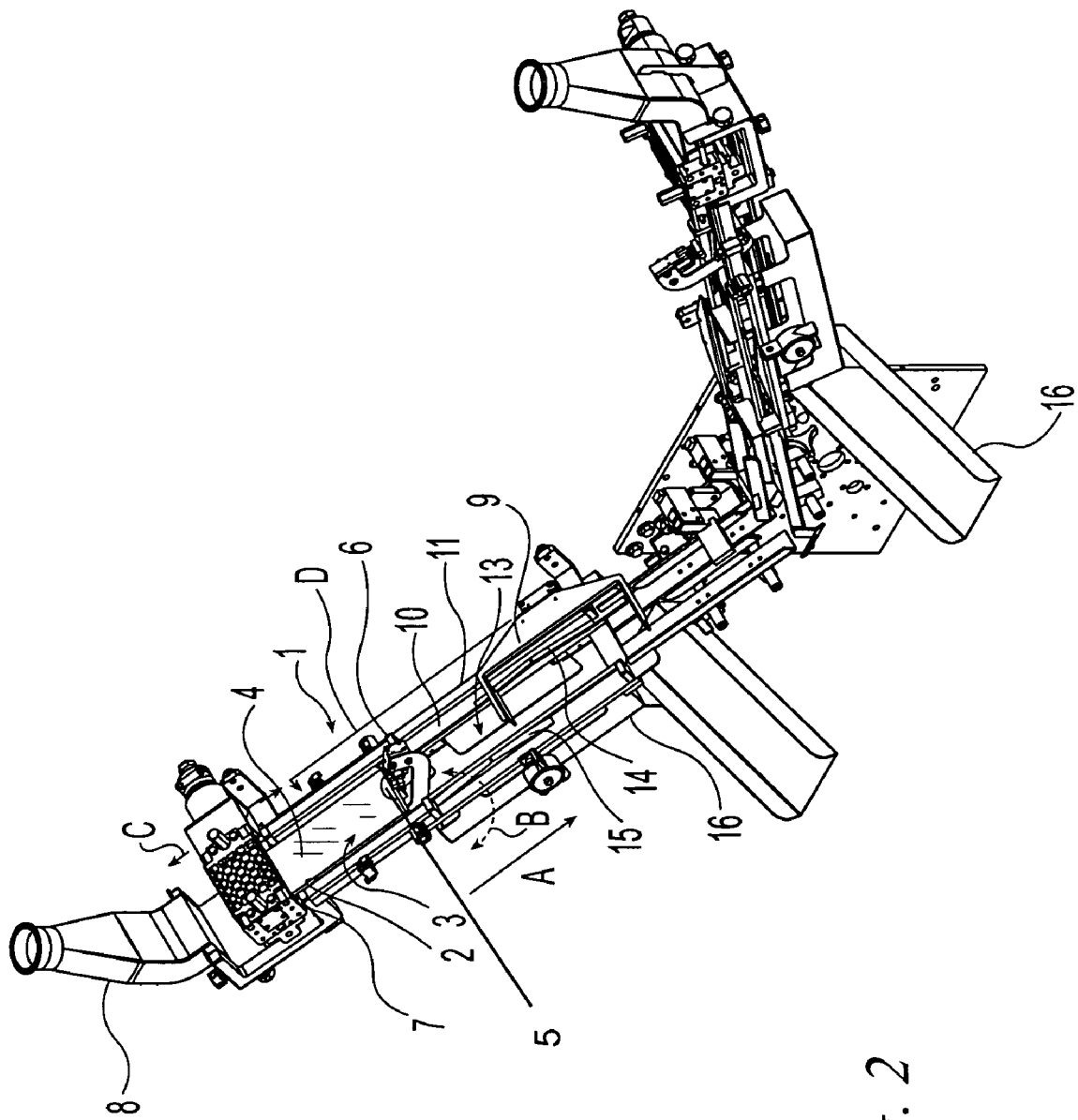
FIG. 2 is another perspective view of an apparatus for unwrapping a package of frangible articles bearing a wrapping material shown in another operational position, in accordance with one embodiment of the present invention.

FIG. 2 shows the apparatus 1 having a support member 2 bearing the package of frangible articles 3 having a wrapping material having a rear portion 4 and a forward tab 5, the forward tab 5 adapted to open the wrapping material when pulled.

Also shown is a grasping mechanism 6 adapted to grasp the forward tab 5 and to pull it away from the package, such as in the longitudinal direction of the support member (or chute) 2 (i.e., parallel to direction A) and/or downward, such as by reciprocating as shown in direction arrow B in FIGS. 1-4, so as to open the wrapping material. In the preferred embodiment, the grasping mechanism 6 reciprocates though an opening in the support member 2. The grasping mechanism may be actuated by an air or hydraulic drive, or an electric solenoid.

Figure 3:
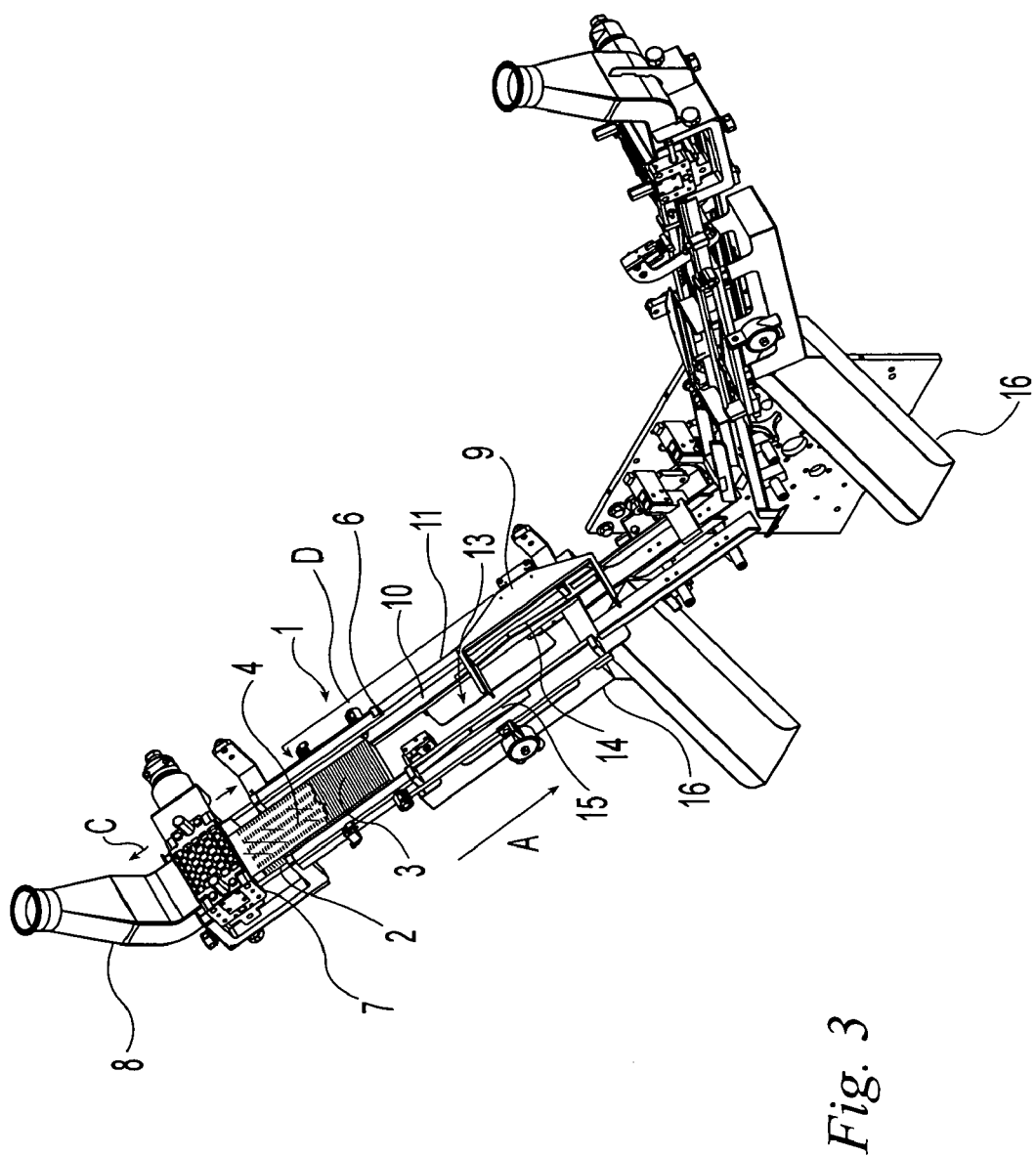
FIG. 3 is another perspective view of an apparatus for unwrapping a package of frangible articles bearing a wrapping material shown in still another operational position, in accordance with one embodiment of the present invention.

After the wrapping material 4 has been opened by the grasping mechanism shown in FIG. 2, an engaging mechanism 7 moves forward and engages the rear portion of the wrapping material 4 and pulls the wrapping material so as to remove the wrapping material completely from the frangible articles (see FIG. 3 showing the wrapping material 4 being removed), leaving them intact on the support member (or chute) 2, in a series aligned substantially perpendicular to the longitudinal axis of the support member 2. This may be done for instance by a mechanism that is moved into position over the package for instance by an air cylinder which moves the rollers into a contact position with the package, and are adapted to engage the rear of the wrapping material with rubber, stainless or aluminum rollers to push the wrapping material rearward (opposite direction A) and off the frangible articles. The rollers preferably engage both the top and bottom surface of the wrapping material and may be driven by any acceptable means, such as an air drive. The engaging mechanism 7 may be mechanized so as to reciprocate along direction arrow C in FIGS. 2 and 3, to bring its rollers or other grasping or engaging mechanism into contact with the wrapping material 4. For instance, starting from the position shown in FIG. 2, and after a package of articles 3 has been placed on the support member 2, the engaging mechanism 7 may first be moved from over the package of articles 3 to allow its rollers to engage the top rear portion of the wrapping material 4. After the grasping mechanism 6 has opened the package of articles 3, the rollers are engaged to roll the wrapping material 4 from about the articles 3. After removal of the wrapping material 4 from about the articles 3, the engaging mechanism 7 returns to its original position which clears the way for the guide mechanism 9 to engage the unwrapped frangible articles in a series.

Preferably, the wrapping material 4 is removed from the engaging mechanism by a vacuum tube, such as vacuum tube 8 that is attached to a vacuum hose (not shown). The vacuum may be positioned so as to assist in the removal of the wrapping material as it comes free of the frangible articles, or otherwise to accept the wrapping material and transport it away from the rest of the apparatus for disposal.

Figure 4:
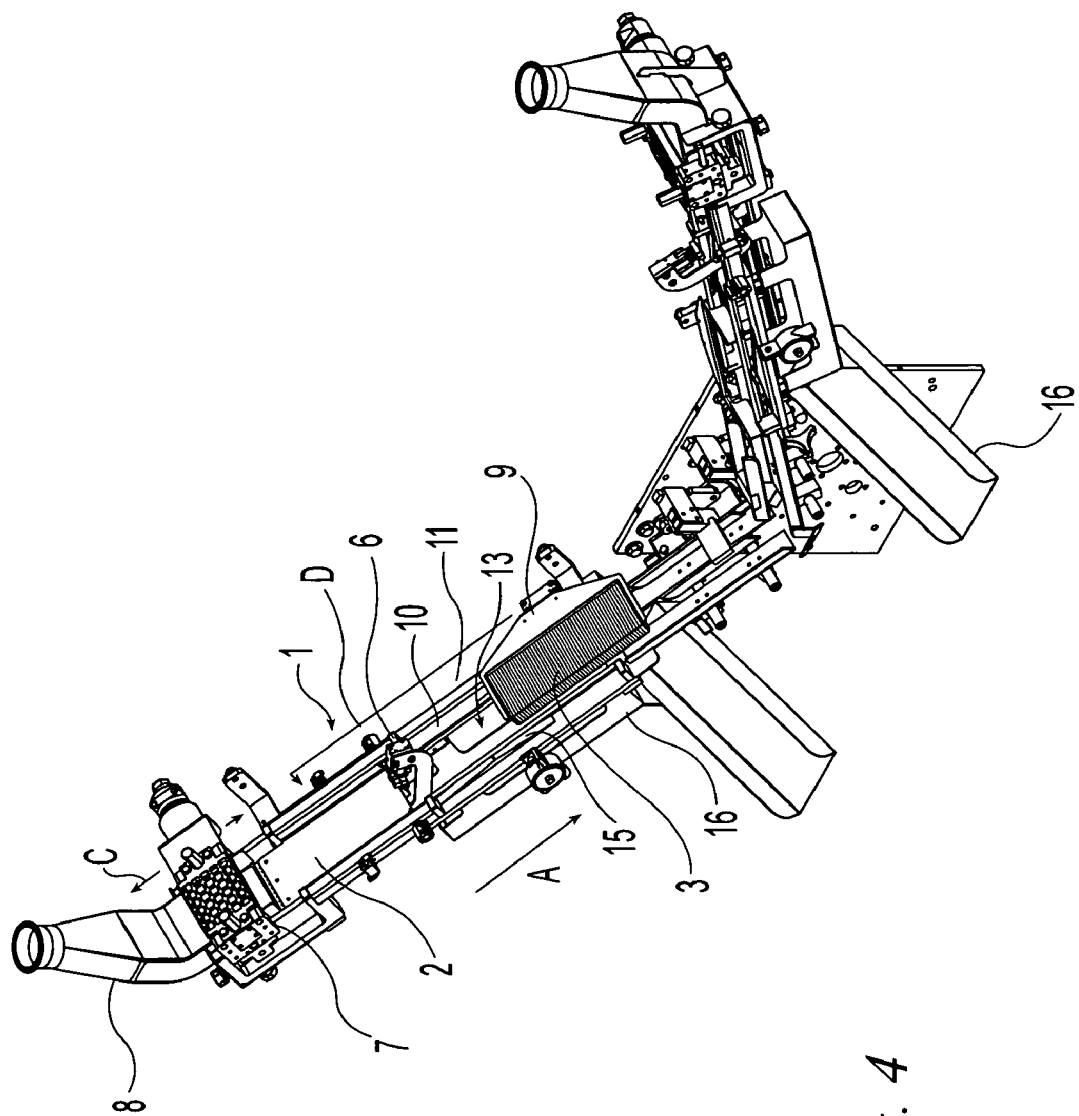
FIG. 4 is another perspective view of an apparatus for unwrapping a package of frangible articles bearing a wrapping material shown in still another operational position, in accordance with one embodiment of the present invention.

Also shown in FIGS. 1-4 is guide mechanism 9 adapted to engage the unwrapped frangible articles in a series and move the frangible articles along the support member 2, by reciprocating along its longitudinal axis as each package is unwrapped, for further transport. This guide mechanism preferably is moved first above and then over each successive series of unwrapped frangible articles (see direction arrow D), such that and its forward and rearward tines or sides engage the respective forward and rearward sides of the series of frangible articles so as to maintain them in an ordered series as they are then moved along the support member 2 by the guide mechanism 9 (i.e., along direct arrow A). See FIG. 4 showing the guide mechanism 9 progressing along the support member 2. The support member preferably is in the form of a chute having a bottom 10 and sides 11, with a gap 13 in the bottom 10 running along the longitudinal axis, such that, as the frangible articles are moved in a series, frangible articles in the series that are broken fall through the gap. It is also preferred that the bottom 10 of the support member 2 has raised portions 14 and 15 on either side of the gap 13, and preferably offset, such that, as the frangible articles are moved in a series, the series of frangible articles is subjected to a toggling motion as they are moved along the support member 2, such that frangible articles in the series that are cracked are allowed or caused to break completely such that the pieces thereof become dislodged from the series and more readily and easily fall through gap 13 onto waste chute 16, as shown in FIG. 5.

Figure 5:
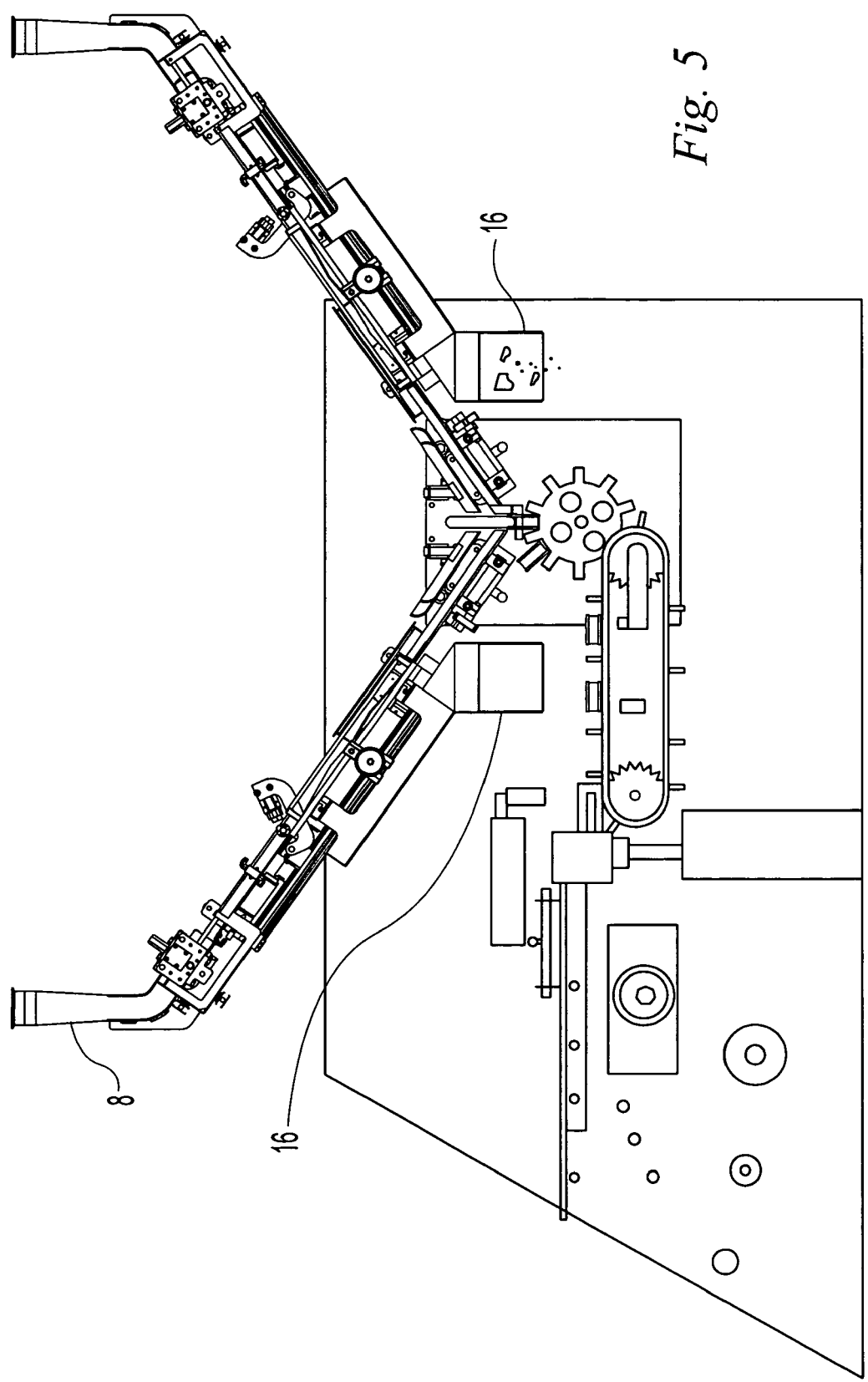
FIG. 5 is a front elevation view of an apparatus for unwrapping a package of frangible articles bearing a wrapping material, in accordance with one embodiment of the present invention.

The frangible articles are moved by the guide mechanism 9 to a position at or near the bottom of the chute where they may be individually registered and placed into the filling mechanism as shown in FIG. 5. The guide mechanism may be actuated by any appropriate energized apparatus, such as by air driven, hydraulic or electric motor.

FIG. 5 is a front elevation view of an apparatus for unwrapping a package of frangible articles bearing a wrapping material shown with the balance of a typical machine adapted to register the sandwich wafers and fill them with ice cream, in accordance with one embodiment of the present invention. As can be appreciated from FIG. 5, the apparatus of the present invention may be used in tandem to supply frangible articles, such as two wafers, to either side of a wafer indexing wheel, as is known in the art.

It is preferred that the support member 2 be inclined to the horizontal.

Although the packages may also be loaded by hand, it is also preferred that the apparatus additionally comprise a robotic loader adapted to grasp a package of frangible articles and place it onto the support member 2. Examples of appropriate robotic loaders are those commercially available from Fanuc of Japan. These robotic loaders may be placed so as to be able to take the wrapped wafers from a case in series and placed them one at a time at the unwrapping position on the support member 2 (i.e., in the position shown in FIG. 1).

The frangible articles in the series are advanced by guide mechanism 9 to the distal or lower end of the support member 2 where they are individually registered and placed into an indexing wheel (not shown) to be supplied with a portion of ice cream between opposing wafers, using mechanisms, machinery and methods known in the art.

FIG. 5 shows the balance of an ice cream sandwich machine with which the present invention may be used. FIG. 5 shows an ice cream sandwich machine having an ice cream extrusion head 17 and indexing wheel 18. These portions cooperate to fill the wafer pairs. The ice cream sandwiches are then transported by conveyor 19 for wrapping and packaging using methods and machinery known and used in the art.

Figure 6:
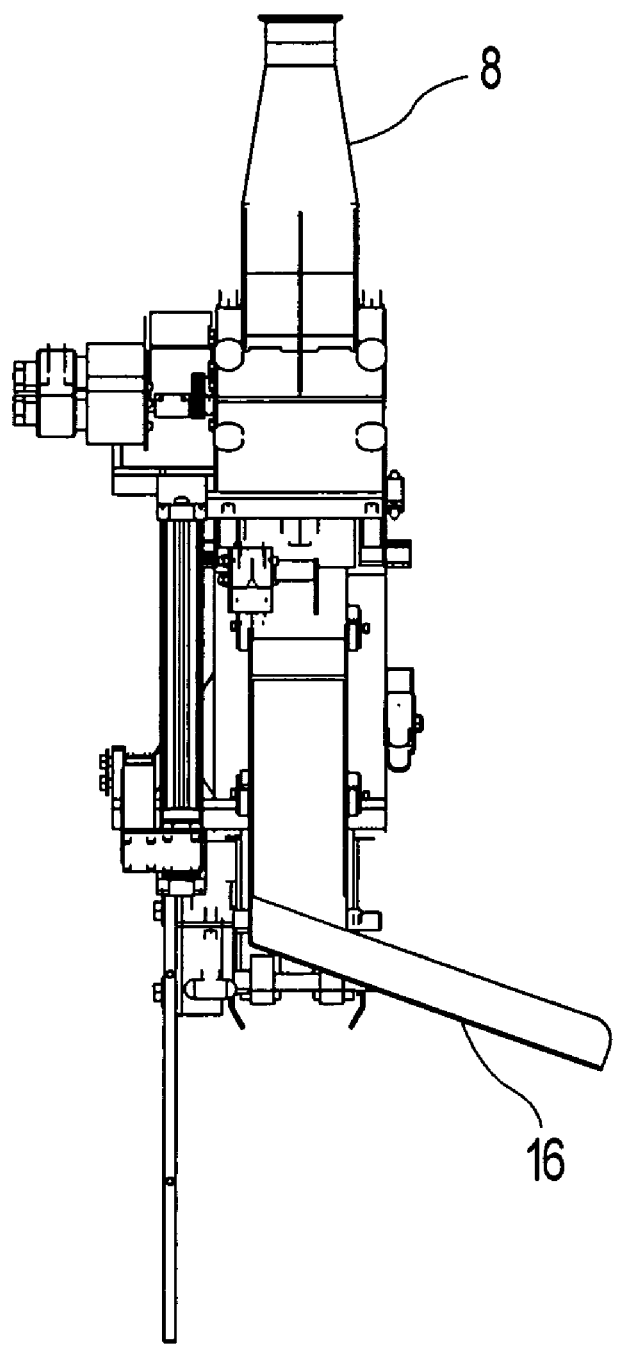
FIG. 6 is a side elevation view of an apparatus for unwrapping a package of frangible articles bearing a wrapping material, in accordance with one embodiment of the present invention.

FIG. 6 is a side elevation view of an apparatus for unwrapping a package of frangible articles bearing a wrapping material, in accordance with the embodiment of the present invention shown in FIG. 1 and wherein the same reference numerals are used as in FIG. 1.

Many other changes and modifications may be made to the present invention without departing from the spirit thereof. The scope of these and other changes will become apparent from the appended claims.

What is claimed is:

1. An apparatus for unwrapping a package of frangible articles bearing a wrapping material, said wrapping material having a rear portion and a forward end bearing a forward tab, said forward tab adapted to open said wrapping material on said forward end when pulled, said apparatus comprising:

(a) a support member for supporting said package;

(b) a grasping mechanism adapted to grasp said forward tab and to pull said forward tab so as to open said wrapping material on said forward end;

(c) an engaging mechanism adapted to engage said rear portion and pull said wrapping material so as to remove said wrapping material from said frangible articles;

(d) a sandwich product assembly station comprising an extruder nozzle mounted for discharge of a comestible filling material in the downward direction and disposed adjacent said support member; and (e) a sandwich indexing wheel rotatably mounted below said support member, said indexing wheel defining a plurality of circumferentially positioned pockets for receiving and transferring assembled sandwiches for conveyance.

2. An apparatus according to claim 1 wherein said support member has a longitudinal axis, and wherein said frangible articles are in a series and are aligned substantially perpendicular to the longitudinal axis of said support member.

3. An apparatus according to claim 1 wherein said wrapping material is removed from said engaging mechanism by a vacuum.

4. An apparatus according to claim 1 wherein said support member has a longitudinal axis and said frangible articles are in a series aligned substantially perpendicular to said longitudinal axis of said support member, and additionally comprising a guide mechanism adapted to engage said frangible articles in a series following the removal of said wrapping material and move said frangible articles along said support member.

5. An apparatus according to claim 4 wherein said support member is in the form of a chute having a bottom and sides, and a longitudinal axis and a gap in said bottom and running along said longitudinal axis, such that, as said frangible articles are moved in said series, frangible articles in said series that are broken fall through said gap.

6. An apparatus according to claim 5 wherein said bottom of said support member has a raised portion on said bottom and on either side of said gap, such that, as said frangible articles are moved in said series, frangible articles in said series that are broken fall through said gap.

7. An apparatus according to claim 1 wherein said support member is inclined to the horizontal.

8. An apparatus according to claim 1 additionally comprising a conveyor below said sandwich indexing wheel for conveying assembled sandwiches.

9. An apparatus according to claim 1 additionally comprising a packaging device to which said conveyor conveys said assembled sandwiches.

10. An apparatus according to claim 8 additionally comprising a wrapping device to wrap said assembled sandwiches.

* * * * *